United States Patent [19]

Duncan

[11] 4,184,195
[45] Jan. 15, 1980

[54] DECORATIVE CANDLE LAMP

[76] Inventor: Charles P. Duncan, 109 15th St., Washington, D.C. 20003

[21] Appl. No.: 883,678

[22] Filed: Mar. 6, 1978

[51] Int. Cl.² ............................................. F23D 3/16
[52] U.S. Cl. ................................... 362/163; 431/290; 431/291
[58] Field of Search ...................... 362/161, 162, 163; 431/290, 291, 126

[56] References Cited

U.S. PATENT DOCUMENTS

| 589,173 | 8/1897 | Henke | 431/126 |
|---|---|---|---|
| 719,916 | 2/1903 | Walsh | 362/163 |
| 2,176,536 | 10/1939 | McCauley | 431/290 |
| 3,244,872 | 4/1966 | McCormick | D48/24 R |

Primary Examiner—Carroll B. Dority, Jr.
Attorney, Agent, or Firm—Bacon & Thomas

[57] ABSTRACT

A candle lamp made up of a light transmitting, heat resistant chimney that contains and supports a vertically moveable candle holder connected to a candle lifter that extends down through an opening in the bottom of the chimney. A suitable combustion air supply opening is provided in the lower area of the chimney, the chimney typically having a top opening that is substantially smaller than the maximum chimney width.

6 Claims, 4 Drawing Figures

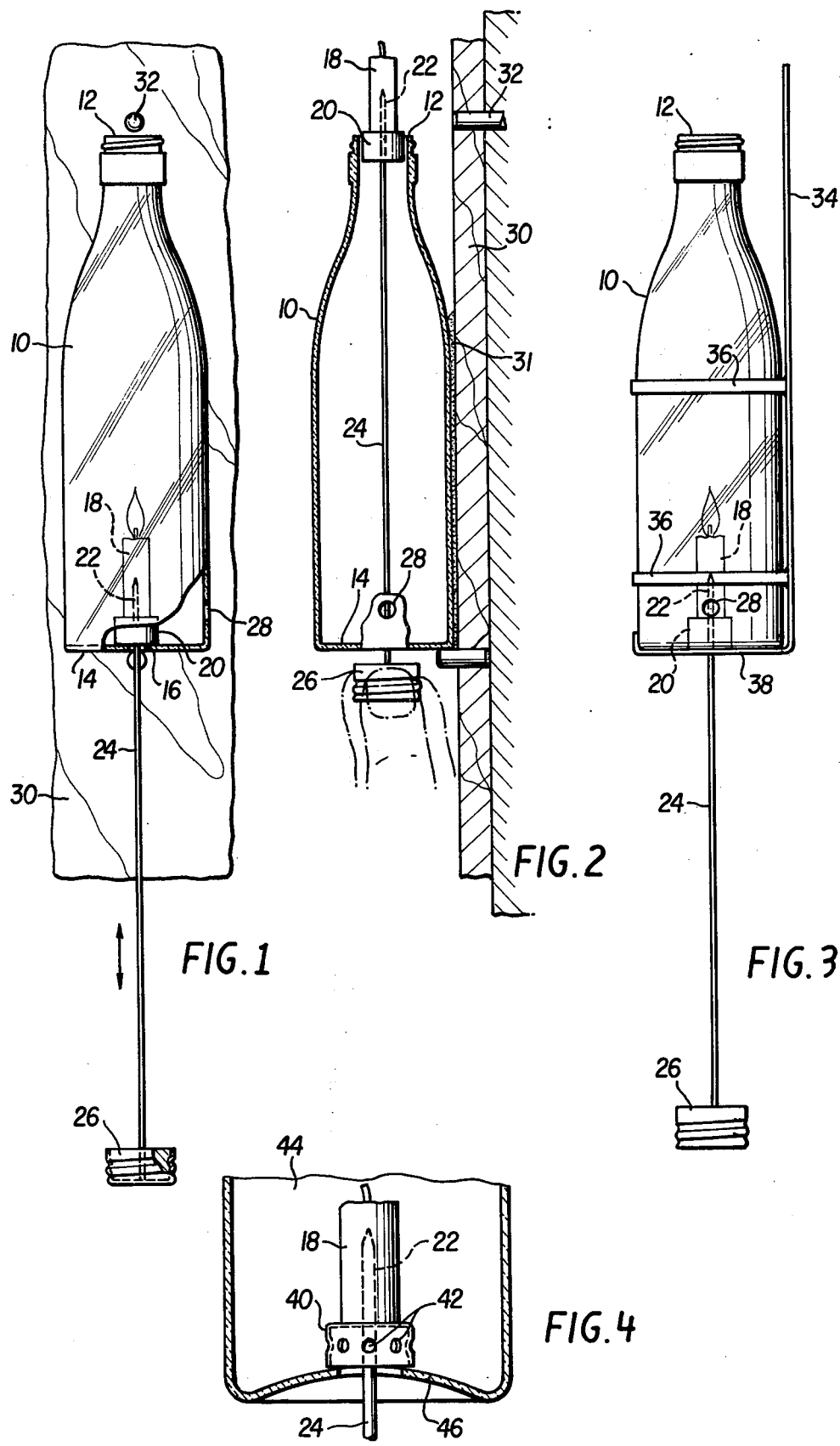

DECORATIVE CANDLE LAMP

FIELD OF THE INVENTION

The invention is in the field of candle lamps.

BACKGROUND OF THE INVENTION

Candle lamps conventionally are constructed with a candle holder mounted upon a fixed support upon which a transparent or translucent chimney is mounted in such a manner that the chimney can be vertically raised to provide access to a candle mounted on the holder for lighting the candle or replacing same when it has been consumed.

Some prior art candle lamps (sometimes referred to as candle lanterns) are arranged to permit the candle holder to be raised up by means of a lifter located above the chimney. In such lamps, the candle holders are usually suspended from the top area of the chimney assembly by means of a suitable support arrangement in this area of the lamp.

Representative examples of prior art candle lamps are seen in U.S. Pat. Nos. 370,770; 589,173; 603,427; 1,705,877 and 3,244,872.

Candle lamps as represented by the foregoing prior art normally do not provide for a simple system of supporting a candle holder within a light transmitting chimney element having a small opening at its top and which is transparent or translucent at least in part, and wherein the candle holder is supported within the chimney by the bottom wall of the chimney with a lifter connected to the candle holder extending downwardly through an aperture in the bottom wall of the chimney. Candle lamps constructed in accordance with the known prior art are seen to be somewhat more complex assemblies designed to permit the chimney to move relatively to the candle holder or to permit the candle to burn at a fixed level (U.S. Pat. No. 370,770 and 603,427); or to lift the candle up through the top of the chimney by a complex lifter assembly located above the candle holder (U.S. Pat. No. 1,705,887). The candle holder according to the latter arrangement, needless to say, becomes sooty and hot to handle until the candle has been extinguished for a suitable period of time.

SUMMARY OF THE INVENTION

The present invention is a candle lamp that is made up essentially of an upright chimney made at least in part from heat resistant, light transmitting material, and having a top opening and a bottom wall through which an aperture extends. A candle holder is supported within the chimney by the bottom wall and a lifter connected to the candle holder extends downwardly through the aperture in the bottom wall of the chimney to permit the candle holder to be raised substantially to the top opening of the chimney.

The chimney may, for example, be a simple, small-mouthed hollow bottle with one or more openings in its bottom to accommodate the lifter for the candle holder and to admit combustion air.

The lifter for the candle holder may be a simple elongated rod element and the candle holder may be a simple socket or platform having an upwardly extending candle impaling or other candle securing means associated with it.

The top opening of the chimney is substantially smaller than the maximum transverse dimension of the chimney, and the height of the chimney is normally greater than its width.

A single aperture may extend through the bottom of the chimney and the candle holder may be arranged to normally cover the aperture while still providing an air path into the chimney from the exterior thereof.

Simplicity and low cost are the key characteristics of the candle lamp constructed in accordance with this invention, and the decorative potential for the lamp is virtually limitless. Any of a vast assortment of bottle shapes, colors and sizes can readily be used for the chimney and any support arrangement for the bottle can be devised by the imaginative lamp maker. The lamp is particularly suitable for wall hanging because of its design, a feature that is not generally possessed by most prior art candle lanterns. The wall hanger design can be readily integrated into the design of the lamp, particularly the candle holder lifter, and for added artistic effect, when a bottle having a cap closure is used for the chimney, the cap or closure element can be used as a handle at the bottom of the candle lifter.

The invention is especially adapted to be used with small mouthed bottle containers that are taller than their diameter. Such bottles normally would not permit ready placement of a candle within the interior of the bottle or lighting of the candle after the same has been placed in the bottle.

A description of the specific preferred embodiments of the invention is presented below in conjunction with the appended drawings illustrating the embodiments.

DETAILED DESCRIPTION OF THE INVENTION

DESCRIPTION OF THE DRAWINGS

FIG. 1 is a front elevational view of a candle lamp embodying the present invention;

FIG. 2 is a side elevational view of the candle lamp showing the candle holder in elevated position;

FIG. 3 is a side elevational view of an alternative embodiment of the candle lamp; and FIG. 4 is a detailed view of a candle holder usable with various embodiments of the candle lamp.

DETAILED DESCRIPTION

With reference to FIG. 1, a candle lamp embodying the invention comprises a one-piece chimney 10 that is made from a completely or partly transparent or translucent heat resistant material, such as glass. The chimney can be clear or colored or a combination of clear and colored and may be of any suitable decorative design. The chimney also could be smooth or textured depending upon the aesthetic effect that is desired. As illustrated, the chimney 10 is a simple, clear soda-pop type bottle having a narrow top opening 12 that is considerably smaller than the maximum bottle transverse dimension (diameter). The height to diameter ratio is also rather large, as it typical of such bottle containers.

The chimney 10 has a bottom wall 14 through which an aperture 16 extends. The bottom wall is shown as being constructed integrally with the side walls of the bottle but it should be understood that the bottom could be formed in any manner, so long as it provided a support for the candle holder to be described below.

A candle 18 is supported within the chimney 10 by means of a candle holder 20 of any suitable design. Preferably, the holder 20 readily fits through the opening 12 of chimney 10 for ease of assembly and overall simplicity. Likewise, the candle 18 must readily fit through opening 12 to permit simple insertion of the candle 18 in holder 20, which will usually have some means for engaging and holding the candle upright in the lamp. In this embodiment, a candle impaling pin 22 is shown used to hold the candle to the holder. Naturally, a spring or friction socket for any suitable candle engaging feature could be utilized to the extent that such devices are available and adapted for use in a candle support of the type illustrated.

If the bottom 14 of the container 10 were formed from a separate piece, conceivably a candle and candle holder of larger diameter than the opening 12 could be utilized by placing such candle and holder upon the removeable bottom of the chimney and thereafter attaching the entire assembly to the bottom of the chimney 10. Thereafter, the candle could be raised, along with its holder, to permit its lighting through the aperture 12 without the need for removing or disassembling the bottom from the chimney until it was desired to entirely replace the candle.

A lifting rod 24 having a gripping and counterweight element 26 at its lower end connected to the candle holder 20 and depends from the chimney 10 through aperture 16 in the bottom 14 of the chimney.

The chimney 10 is provided with another aperture 28 in one of its lower side areas for admitting combustion air to the inside of the chimney. If the opening 16 for the lifting rod is large enough, and if the candle holder 20 is designed to permit passage of combustion air through the opening 16, the opening 28 could be dispensed with.

It is preferred, in accordance with this invention, that the chimney 10 be constructed as a single piece for the sake of simplicity and low cost and to permit ready recycling of glass bottle containers. It is also preferred that the opening 28 be provided to eliminate the need for one to be concerned with the single aperture 16 being closed off by candle drippings and to thereby prevent ingress of combustion air into the chimney.

The chimney 10 can be mounted on a decorative backsheet or other form of structural frame work or bent wire support bracket, depending upon one's choice of design. As illustrated, the chimney is mounted on a decorative wood panel 30 by a suitable adhesive 31. The panel 30 in turn is mounted to a wall or other vertical support by a fastener 32 or the like.

In FIG. 3, an alternate arrangement for mounting the chimney is illustrated, and comprises a wire or sheet metal decorative bracket 34 having bottle support rings 36 and a platform 38 for holding the chimney 10 upright and substantially vertical.

In FIG. 4, the bottom of the chimney is provided with a single aperture 16 through which candle lifter 24 extends. The candle holder 40 here is provided with apertures 42 (they could be slits or other shaped openings) that enable combustion air to enter the chimney 44 which is shown as having an arched bottom 46 for conveying the candle drippings away from the openings 16. Such an arched bottom wall is typical in many bottle constructions.

Various arrangements of air inlets could be used instead of those illustrated without departing from the spirit and scope of the invention, and similarly the candle holders illustrated can be varied to suit the particular needs of any lamp design.

In use, as illustrated in FIG. 2, the candle holder 20 is manipulated into an elevated position near the opening of the chimney so a candle 18 can be placed on the holder and secured in that position. The candle may then be lit and lowered into position on the bottom of the chimney (FIG. 1), where it can be seen that the bottom of the chimney forms the sole support for the candle holder. The candle is extinguished normally by lifting it up and blowing it out at the chimney opening, but any other suitable means can be utilized to snuff out the candle.

The gripping element 26 illustrated comprises a cap or closure for the bottle constituting the chimney 10. The lifting rod 24 can simply be potted into the interior of the cap by a suitable settable agent, such as epoxy resin.

Preferred embodiments of the invention has been describe to exemplify the concept underlying same, but the scope of protection which is sought and which is ultimately obtained is intended to be limited only by the scope of the following claims.

What is claimed is:

1. A candle lamp comprising
   an upright chimney made at least in part from heat resistant, light transmitting material, and having a bottom wall and a top opening;
   an aperture in the bottom wall;
   a candle holder supported within the chimney by the bottom wall;
   a lifter connected to the candle holder and extending downwardly through the aperture in the bottom wall;
   the lifter being arranged to permit the candle holder to be raised substantially to the top opening of the chimney.

2. The candle lamp according to claim 1, the chimney comprising a single integral hollow element.

3. A candle lamp according to claims 1 or 2, the top opening being substantially smaller than the maximum transverse dimension of the chimney, and the height of the chimney being greater than its width.

4. A candle lamp according to claims 1 or 2, including an additional aperture extending through a wall of the chimney at its lower area.

5. A candle lamp according to claim 1, including means adapted to engage the chimney for supporting the chimney and candle holder assembly in a substantially upright orientation relative to a vertical support.

6. A candle lamp according to claim 1, the candle holder normally covering the aperture in the bottom of the chimney and including an air passage for permitting combustion air to enter the chimney from the bottom aperture.

* * * * *